(No Model.)
A. BINGHAM.
COMBINED SAW SET AND WRENCH.
No. 245,603. Patented Aug. 16, 1881.
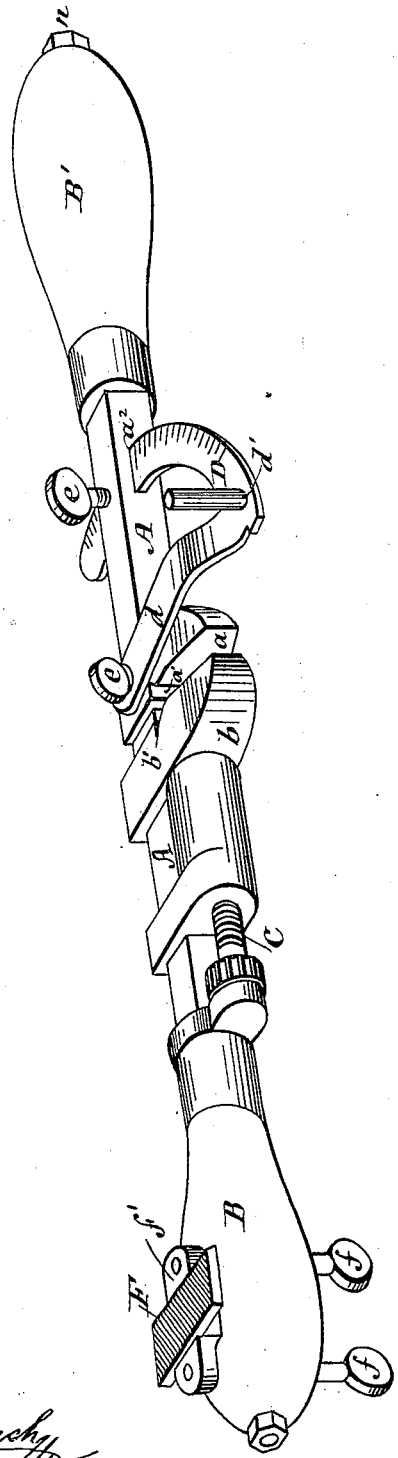
Witnesses:
W. B. Masson
Paul Strobach
Inventor:
Arthur Bingham

UNITED STATES PATENT OFFICE.

ARTHUR BINGHAM, OF TALLADEGA, ALABAMA.

COMBINED SAW-SET AND WRENCH.

SPECIFICATION forming part of Letters Patent No. 245,603, dated August 16, 1881.

Application filed April 12, 1881. (No model.)

*To all whom it may concern:*

Be it known that I, ARTHUR BINGHAM, a citizen of the United States, residing at Talladega, in the county of Talladega and State of Alabama, have invented a new and useful Combined Saw-Set and Wrench, of which the following is a specification.

My invention has for its object to set the teeth of circular saws at any desired angle by grasping the teeth within the jaws of a wrench having on their inner-face sides angular notches, the inclination of the teeth being controlled by a gage attached to an arm of the wrench.

The further object of my invention is to correct any roughness or irregular deflection remaining on the teeth after they are set by the use of an adjustable plate resting on a sliding carrier attached to one of the handles of the device, all as hereinafter described and claimed.

In the accompanying drawing, $a$ is a fixed, and $b$ a movable, jaw. The jaw $b$ is moved on the bar A by turning the screw C. On the inner face of each jaw is an angular notch, $a'$ $b'$, in which the point of the tooth that is being set is protected.

D is a quarter-circle gage, having a depending rectilinear bar, $d$, with a bent shoulder, so as to readily pass over the fixed jaw $a$. The quadrant or quarter-circle gage has grade-marks on its face, so that the proper angle of the bar $d$ may be accurately determined and adjusted. One arm of the wrench-bar has a slot, $a^2$, through which one end of the quadrant-gage passes. Thumb-screws $e$ $e$ hold this gage rigidly in position when adjusted. The gage has a leg, $d'$, which is used to keep the device a proper distance from the face of the saw when the file-plate is brought into play.

F is a file-plate which rests upon a carrier, $f'$. The carrier and plate are adjusted and retained firmly in proper position by thumb-screws $f$ $f$. The bar A is rigidly held within sockets of the handle B; but the handle B' and that portion of the bar A extending beyond the stationary jaw $a$ can be withdrawn. The separable parts can be connected by means of a screw or any suitable mechanism. When this is done and the gage D and file-plate and its carrier are removed a complete monkey-wrench is formed.

Operation: The saw-teeth are placed within the jaws $a$ $b$, the extreme points falling within the notches on the jaw-faces. Before commencing to set the teeth the gage is adjusted so as to project the bar $d$ to the proper angle. Each tooth is then successively placed within the jaws $a$ $b$, and is firmly grasped by turning the screw C, the extreme points of the teeth being protected by the notches $a'$ $b'$, as before set forth. The handles B B' are then grasped by the operator, and the whole device is turned so as to bend or set the teeth to the proper degree of inclination, the leg $d$ of the gage D preventing the saw-tooth from being bent beyond the angle of the adjustment, and it is manifest that by this operation each tooth in turn is set to the required degree. Although all the teeth have been thus deflected at the same angle, still it sometimes happens that portions of the edges of some of the teeth may be roughened, which roughness should be removed. The function of the file-plate is to remove every irregularity of this character. The file-plate is adjusted to the desired plane, and is rigidly held in position by the thumb-screws $f$ $f$. The point of the leg $d'$ is placed on one side of the saw, which, with the thumb-screws $e$ $e$, forms a central rest for the whole device. Pressure is then brought to bear on the handle that carries the file-plate. This file-plate is then carried round the periphery of the saw, passing over all the teeth in succession, filing off all roughness or excessive deflection that may exist. Thus all the teeth are uniformly set.

Having now fully described my invention, what I claim is—

1. A saw-set having handles B B', carrying wrench-bar A, on which is a fixed jaw, $a$, and sliding jaw $b$, in combination with the adjustable quadrant-gage D, having a depending bar, $d$, adapted to set all the teeth of a saw at uniform inclination, substantially as described.

2. In a saw-set, the wrench-bar A, having jaws $a$ $b$, graded gage D, and screws $e$ $e$, jointly with an adjustable file-plate, $f'$, and file F, substantially as described.

ARTHUR BINGHAM.

Witnesses:
PAUL STROBACH,
S. H. JACOBSON.